United States Patent [19]
Flesch

[11] 3,938,387
[45] Feb. 17, 1976

[54] PRECISION TEMPERATURE TRANSDUCER FOR MEASURING THE SURFACE TEMPERATURE OF THE HUMAN AND ANIMAL SKIN

[76] Inventor: Udo Flesch, Wegscheider Str. 3-4/D-1-20, Berlin, Germany

[22] Filed: Sept. 19, 1974

[21] Appl. No.: 507,599

[30] Foreign Application Priority Data
Mar. 21, 1974 Germany............................. 2414048

[52] U.S. Cl.................. 73/359; 73/362.4; 73/362.8
[51] Int. Cl.²....................... G01K 1/20; G01K 7/00
[58] Field of Search..... 73/359, 355 R, 362.4, 362.8

[56] References Cited
UNITED STATES PATENTS

| | | | |
|---|---|---|---|
| 1,942,516 | 1/1934 | Noyes | 73/359 X |
| 2,012,112 | 8/1935 | States | 73/359 X |
| 2,032,407 | 3/1936 | Frickey | 73/359 X |
| 2,195,019 | 3/1940 | Bloomheart | 73/362 AR |
| 3,266,314 | 8/1966 | West | 73/359 |
| 3,282,107 | 11/1966 | Ekstrom | 73/355 R |
| 3,464,864 | 9/1969 | Rentz | 73/359 X |
| 3,525,260 | 8/1970 | Kung | 73/355 R X |
| 3,715,923 | 2/1973 | Hornbaker et al. | 73/359 X |
| 3,875,799 | 4/1975 | Webster | 73/362.8 X |

*Primary Examiner*—Jerry W. Myracle
*Assistant Examiner*—Frederick Shoon
*Attorney, Agent, or Firm*—Ralf H. Siegemund

[57] ABSTRACT

A transducer for measuring the surface temperature of the human and of animal skin with a resolution of 0,02 K (0.04°F), a calibration accuracy to within 0,1 K (0,2°F) absolute and a response time within 2 ms has been developed. The transducer includes a tube transparent to thermal radiation and open at both ends. A temperature sensing element is suspended across one end for placement adjacent to the skin.

3 Claims, 3 Drawing Figures

U.S. Patent   Feb 17, 1976   3,938,387
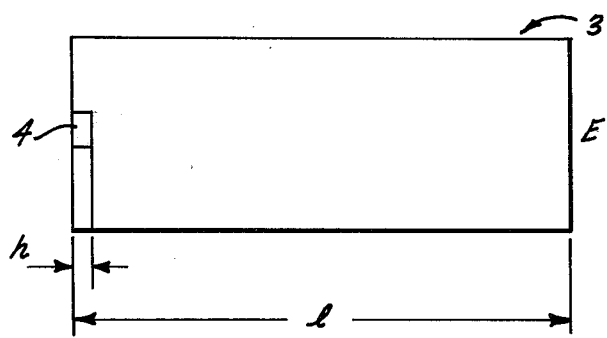
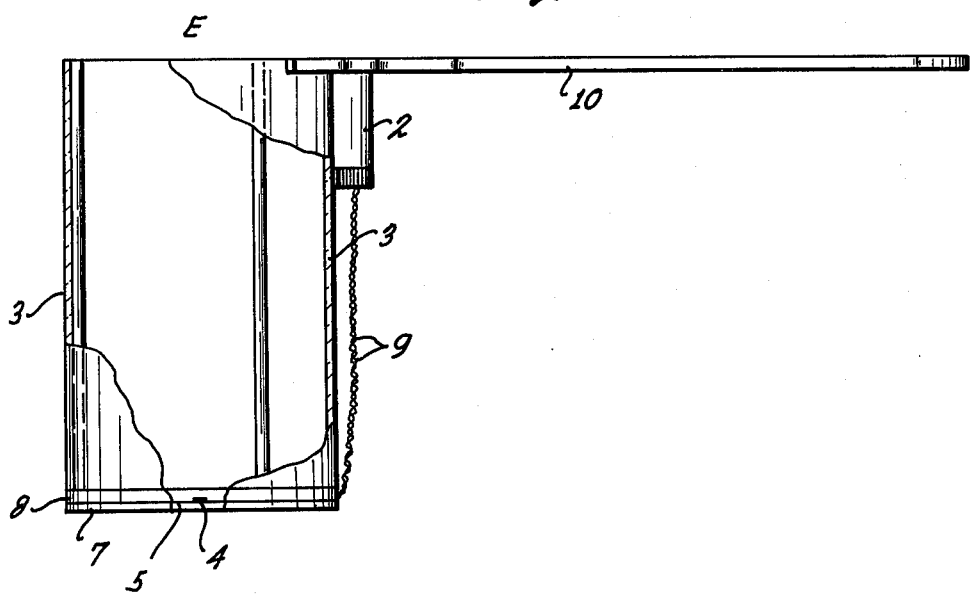
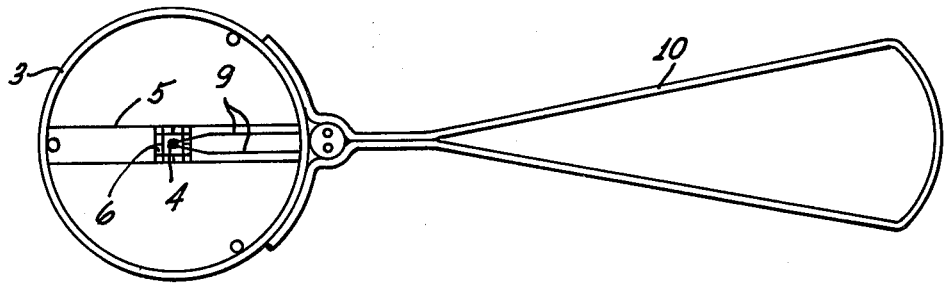

PRECISION TEMPERATURE TRANSDUCER FOR MEASURING THE SURFACE TEMPERATURE OF THE HUMAN AND ANIMAL SKIN

BRIEF SUMMARY OF THE INVENTION

The present invention relates to a transducer for measuring the surface temperature of the human and of animal skin.

It is an object of the present invention to provide such transducer having a resolution of 0.02 K (0.04°F), a calibration accuracy to within 0.1 K (0.2°F) absolute and a response time of less than 2 ms. Moreover, the transducer should not influence the temperature of the skin and specifically the heat flow from the surface to the environment (heat conduction, thermal radiation and evaporation) should not be influenced within the accuracy of measurement.

In accordance with the preferred embodiment of the invention, it is suggested to place a temperature sensing device (transducer) at one end of a container whose walls are transparent to thermal radiation, but eliminates convection in the vicinity of the element when placed adjacent to the skin. The container is for example a cylindrical tube which is open at both ends. The temperature sensitive element is mounted to one end, while the other end communicates with the environment. The transducer is preferably a commercially available miniature-thermistor or miniature-thermocouple and is in principle a contact-measuring device. The skin on which the device is placed is not damaged.

This apparatus has the following advantages:

It is of very simple construction; simple to calibrate; does not influence the temperature of the skin and the heat flow from the surface to the environment (heat conduction, thermal radiation and evaporation) within the accuracy of measurement; has a small thermal mass; experiences nearly no reaction from the skin; permits measurement of the absolute temperature and of the difference in temperature in relation to the environment; permits simple and automatic recording of the output; and permits measurement for example during radiological treatment.

BRIEF DESCRIPTION OF THE SEVERAL VIEWS OF DRAWINGS

FIG. 1 is a schematic diagram of a cylinder with temperature sensing elements, illustrating the geometric relation and introducing the parameters used in the description;

FIG. 2 is a side view of an apparatus in accordance with the preferred embodiment of the invention; and FIG. 3 is a rear view along lines 3—3 of FIG. 2.

DETAILED DESCRIPTION

A tubular container 3 which is open at both ends i.e. top and bottom, is made of a material which is transparent to thermal radiation and defines a cylindrical air-column having a height $l$. The bottom of the open cylindrical tube 3 (FIG. 2) has a rim 8 which carries an annulus 7 made of felt and which is to be placed in contact with the surface of the skin. The open top of the cylindrical container 3 is held by a handle 10 and communicates with the environment E.

The air-column or cylinder inside of this container 3 is insulated against heat flow from the sides. Therefore, the temperature in the cylindrical container falls linearly from the bottom to the top. The bottom end of tubular container 3 is also open, and a miniature thermocouple or miniature thermistor 4 having a height $h$ is located in the center of the bottom of the tubular container 3. Specifically, the thermistor 4 is mounted on a wire mesh 6 which is held in place by plastic thread 5, fastened to the bottom rim 8 of the container 3. Thus, the temperature sensing element is suspended across the open bottom of container 3.

A plug 2 is provided adjacent to the handle 10 as well as to the top of container 3, and connecting wires 9 run to the rim 8 and to the element 4 on mesh 6. A connection can be made from plug 2 to external indicating devices (not shown).

The height $h$ (FIG. 1) of the thermistor or the thermocouple 4 to be used can be calculated from the decrease of the temperature over this distance, which is determined by the desired accuracy of measurement of 0.02 K (0.04°F). If the radius of the cylindrical tube 3 is small there is no convection in the air-column particularly when the bottom of tube 3 is placed directly on the surface whose temperature is to be measured, whereby the felt annulus 7 is in direct contact with that surface, and the wall of tubular container 3 impedes convective flow in the immediate environment of element 4. Thermal radiation constitutes the greatest part of the heat exchange. The wall of tube 3 which is the shell of the air-column therein has to be transparent to thermal radiation, so that there is no influence on the thermal radiation inside of the cylinder.

The transducer as constructed does not influence the temperature of the skin, and the heat flow through heat conduction, thermal radiation and evaporation is sufficiently low so that the measurement is carried out at the accuracy of 0.02 K (0.04°F) or better. By way of example, the cylindrical container 3 is 50 mm high and has a diameter of 30 mm. The wire mesh 6 is provided to integrate the temperature measurement over an area larger than the dimensions of the temperature sensor proper.

I claim:

1. An apparatus for measuring surface temperature, comprising:
   a temperature sensing means; and
   an enclosure for placement adjacent to said surface, the temperature sensing means being disposed in the enclosure, said enclosure being transparent to thermal radiation but preventing convective air flow in the immediate environment of said sensing means, inside of the enclosure, when said sensing means in the enclosure has disposition adjacent to said surface.

2. An apparatus as in claim 1, said container being of cylindrical configuration, having two open ends, and providing an air column, the temperature sensitive element being mounted to one end of the cylinder, the cylinder communicating with the environment at the other end.

3. An apparatus as in claim 1, and including a wire mesh, the temperature sensitive element being mounted on said mesh, said mesh being mounted to an open end of the enclosure.

* * * * *